United States Patent [19]
Harris et al.

[11] Patent Number: 5,863,651
[45] Date of Patent: Jan. 26, 1999

[54] POLY-PYRIDINIUM SALTS

[75] Inventors: Frank Harris, Akron; Chun Hua K. Chuang, Brecksville, both of Ohio

[73] Assignee: The University of Akron, Akron, Ohio

[21] Appl. No.: 90,012

[22] Filed: Jun. 3, 1998

Related U.S. Application Data

[63] Continuation of Ser. No. 296,807, Aug. 19, 1994, Pat. No. 5,763,563, which is a continuation-in-part of Ser. No. 967,246, Oct. 27, 1992, abandoned, which is a continuation-in-part of Ser. No. 703,159, May 20, 1991, abandoned, which is a continuation-in-part of Ser. No. 402,126, Sep. 1, 1989, abandoned.

[51] Int. Cl.$^6$ ..................................................... B32B 19/00
[52] U.S. Cl. ........................... 428/357; 528/335; 528/407; 546/257
[58] Field of Search ..................................... 528/335, 407; 546/257; 428/357

[56] References Cited

U.S. PATENT DOCUMENTS 4,841,021  6/1989  Katritzky et al. ...................... 528/407
4,898,923  2/1990  Katritzky et al. ...................... 528/73

*Primary Examiner*—Samuel A. Acquah
*Attorney, Agent, or Firm*—Renner, Kenner, Greive, Bobak, Taylor & Weber

[57] ABSTRACT

A new class of pyrylium salts and process for the manufacture, as well as the use of the new pyrylium salts as polycondensation components for a new class of polypyridinium salts and a new class of conducting polypyridinium salts manufactured by doping the polypyridinium salts with a conducting dopant is described. The new polypyridinium salts and their conducting doped analogs according to this invention are stable positively charged polymers resistant to base attack and are distinguished by water insolubility making them ideally suited as a metal anti-corrosion coating, stable in basic media making them ideally suited for separation membranes for anions, and as excellent, thermally and chemically stable conducting polymers when doped ideally suited for making electrically conducting materials and as redox catalysts.

6 Claims, No Drawings

POLY-PYRIDINIUM SALTS

This application is a continuation of U.S. Ser. No. 08/296,807 filed on Aug. 19, 1994 now U.S. Pat. No. 5,763,563, which is a continuation-in-part of U.S. Ser. No. 07/967,246 filed on Oct. 27, 1992, now abandoned, which is a continuation-in-part of U.S. Ser. No. 07/703,159 filed on May 20, 1991, now abandoned, which is a continuation-in-part of U.S. Ser. No. 07/402,126 filed on Sep. 1, 1989, now abandoned. 37 C.F.R § 1.78(a)(2).

TECHNICAL FIELD

This invention relates to the synthesis of unique, relatively stable polymers that contain positive ionic sites along the polymer chains.

More particularly, this invention relates to water insoluble poly-pyridinium salts which resist nucleophilic substitution, and which include relatively stable positive charges.

Specifically, this invention relates to poly-pyridinium salts having pendant phenyl groups attached thereto, that may be synthesized by the reaction of bis-pyrylium salts with polyfunctional amines.

BACKGROUND OF THE INVENTION

While polymers containing positive sites along their molecular chain are highly desirable materials that can be used to trap and separate anions, for example when fashioned into films, such polymers are frequently difficult to synthesize. Furthermore, the relatively few such polymers that have been prepared have tended to be unstable, being undesirably susceptible to substitution and elimination reactions. Despite such difficulties, polymers having positive sites in association therewith continue to be of interest in view of the fact that in addition to being useful as ion exchange resins, the polymers can be fabricated into membranes capable of separating negatively charged species from other materials.

Furthermore, such polymers include a demonstrated ability to conduct electricity, particularly when combined, or "doped" with substances such as tetracyanoquinodimethane, TCNQ, making it possible to employ the materials as semiconductors. Among other applications may be mentioned the coating of metals such as steel, copper, iron, aluminum and other metals standardly used throughout industry, with films of the polymers to provide the metallic substrate with protection against corrosive oxidation. In addition, the polymers can function as gas separation membranes.

As mentioned, some polymers which include positive sites along their chains have previously been known, for example, those described in the U.S. Pat. No. 3,988,158. However, the polymers there described have relatively low molecular weights. In addition, all the compounds illustrated in the patent involve aliphatic "backbone" segments, and the patent fails to teach synthesis routes capable of yielding substantially aromatic polymers. In contrast, the polymers contemplated by the instant invention have backbone chains that are substantially aromatic in character, making them far more stable.

Other polymers concerned with chains having positive sites include those described in Japanese patent 59,217,789; however, the polymers taught by the patent are not only soluble in water, but they have a relatively high ionic content, considerably limiting their usefulness in many applications such as metal coatings and membranes for chemical separation.

The polymers of this invention are synthesized under higher temperatures that afford a higher molecular weight poly-pyridinium. The polymers of this invention are also notable for their lack of solubility in water which makes them ideally suited for use as film coatings to prevent or substantially reduce metal corrosion. The use of higher temperatures to afford higher molecular weight polymers is a further distinguishing aspect of the present invention. The polymers of this invention are useful as potential solid polymer electrolytes that function in basic media which is possible because the polymer of this invention enjoy enhanced thermal and chemical stability due to the presence of the pendant aryl group. The polymer of this invention are also capable of being doped by reagents such as 7,7,8,8-tetracyanoquinodimethane resulting in a conductive polymer. Such doped polymers could find use as electrical conducting materials, as redox reagents for carrying out chemical reductions or a potential anti-degradiants to protect oxygen sensitive materials.

DISCLOSURE OF THE INVENTION

In view of the preceding, therefore, it is a first aspect of this invention to provide novel polymer that contain positive sites along their backbone chains.

A second aspect of this invention is to provide polymers with improved stability characteristics that can be used to separate negatively charged ions from other materials.

A further aspect of this invention is the provision of semiconductive polymeric substances that conduct electricity, particularly when treated with doping materials.

Another aspect of this invention is to furnish polymers containing positive sites along their chains that also display reduced susceptibility to substitution and elimination reactions.

A still further aspect of this invention is to provide polymers that are useful as antioxidant and metal corrosion inhibitors when the polymers are applied as films on the metal substrates to be protected, and as gas separation membranes when cast in the form of thin films.

Yet another aspect of this invention is to prepare novel poly-pyridinium salts possessing pendant phenyl groups, which include positive sites along the polymer chains.

An additional aspect of this invention is to provide poly-pyridinium salts through the reaction of bis-pyrylium salts with diamines, particularly diamines that include aromatic groups.

The novel poly-pyridinium salts of the invention consist of the general formula (I):

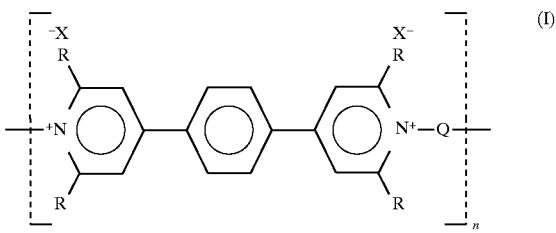

where R is an aryl radical, X is a halogen containing ion, such as chloride, bromide, iodide, perchlorate or tetrafluoroborate and Q is an aryl radical and n is a positive counting number.

The poly-pyridinium salts of formula (I) are prepared by contacting a bis-pyrylium salt of formula (II):

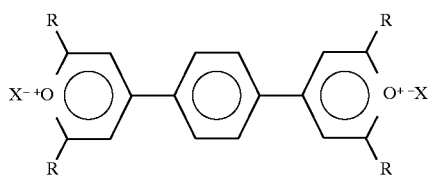

with a diamine of formula (III):

$$H_2N-Q-NH_2 \quad (III)$$

where R, X and Q are as previously defined.

Polymers of formula (I) can be doped with various conductants such as the dilithium salt of 7,7,8,8-tetracyanoquinodimethane ($Li_2TCNQ$), to yield a class of darkly colored fibers which are capable of conducting electricity. The doping reaction involves a partial or complete replacement of the X anions as described above with dopant anions such as TCNQ dianions.

DETAILED DESCRIPTION AND BEST MODE FOR THE INVENTION

The polymers of the invention may be synthesized by the reaction of bis-pyrylium salts with aryl-containing diamines. Poly-pyridinium salts are identified by the presence of positive sites along the backbone of the polymer chains. The poly-pyridinium salts of the present invention are distinguished from normal poly-pyridinium salts in that they are relatively stable materials. Normally, the pressure of positively charged site centers in a molecular structure, such as the positively charged nitrogen of formula (I), renders the molecule susceptible to the attack by nucleophilic reagents. This attack is similar to an acid-base reaction. The poly-pyridinium salts of the present invention owe their enhanced stability toward nucleophilic or base attack, to the positioning of the bulky aryl groups ortho (an adjacent site on the aromatic ring) to the positively charged nitrogen in formula (I). This stability is also enhanced when aromatic diamines are used. Although aromatic diamines are greatly preferred, aliphatic and cyclo aliphatic diamines are also usable to form poly-pyridinium salts of formula (I). The pendant phenyl substituents and the aromatic nature of the polymer linkages make these polymers ideally suited for fibers and films applications.

The polymers are notable in that they form ordered, liquid-crystalline glasses. The liquid-crystalline nature of the polymer glasses is all the more surprising in view of the presence of the pendant phenyl groups, the presence of which could well have been expected to interfere with, or prevent orientation of the polymer chains relative to each other.

While other methods of synthesis are possible, we have found two synthetic schemes particularly advantageous to manufacture bis-pyrylium salts of formula (II). Scheme 1 is shown below:

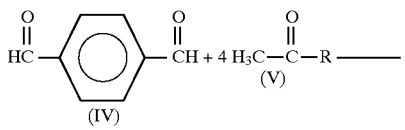

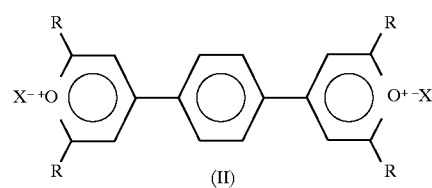

where R is an aryl radical and X is a halogen containing ion as previously described.

Thus, terephthalaldehyde (IV) is reacted with 4 equivalences of an aryl or substituted aryl methyl ketone (V) such as acetophenone to form intermediate (1) which is cyclodehydrated with a triphenylmethyl (TPP) salt where the counterion X is as previously defined. The TPP salt acts as a hydride acceptor reagent to yield a bis-pyrylium salts of formula (II). When R=Ph, intermediate (1) represents 3,3'-p-phenylene-bis-(1,5-diphenyl pentane-1,5-dione).

Scheme 2 for manufacturing bis-pyrylium salts of formula (II) is shown below:

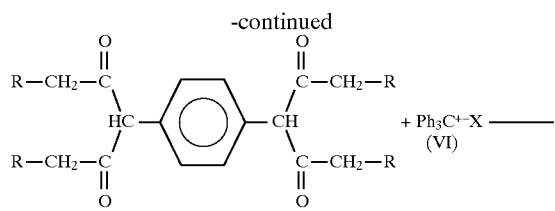

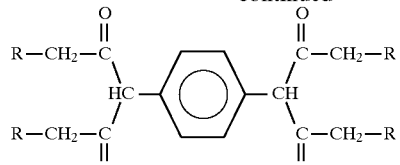

where R and X are as previously described.

Thus, terephthalaldehyde (IV) is reacted with 2 equivalences of an aryl or substituted aryl methyl ketone (V) such as acetophenone to form intermediate (2), a bischalcone, which is reacted with two additional equivalences of the same compound of formula (V) as above in the presence of boron trifluoride etherate to yield bis-pyrylium salts of formula (II). When R=Ph, intermediate (2) represents 3,3'-p-phenylene diacrylophenone.

In Scheme 1, the hydride acceptor reagent can be formed in situ by reacting triphenylmethylalcohol with an appropriate acid, e.g. triphenylmethyl tetrafluoroborate can be prepared in situ by reacting triphenylmethyl alcohol with fluoboric acid in acetic anhydride.

In Scheme 1, the formation of bischalcone intermediate (2) does occur, but this intermediate is not recovered during the reaction and the reaction is forced to intermediate (1) instead as a step saving measure to improve yields and simplify the synthetic scheme.

All of the above condensation reactions which involve reacting terephthalaldehyde with an aryl methyl ketone or a substitute aryl methyl ketone proceed readily in a base-alcohol medium such as ethanolic/potassium hydroxide. Although ethanolic/potassium hydroxide is illustrated in the above examples, other similar solvents and bases may also be used such as isopropanol/sodium hydroxide and isopropanol/potassium hydroxide.

The conversion of intermediate (1) and intermediate (2) in the Scheme 1 and 2, respectively, into bis-pyrylium salts of formula (II) can be carried out in polar aprotic solvent such as N,N'-dimethylformamide (DMF), dimethylsulfoxide (DMSO), N-methylpyrollidone (NMP) or similar solvents.

Aryl,methyl ketones of formula (V) are selected from the representative and illustrative group where R consists of:

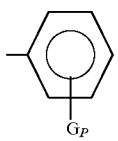

(a)

where G is selected from the representative and illustrative group consisting of an alkyl radical having from about 1 to 16 carbon atoms, preferably from about 1 to 6 carbon atoms, a cyclic alkyl radical having from about 1 to 16 carbon atoms, preferably from about 1 to 6 carbon atoms, an alkoxy radical having from about 1 to 16 carbon atoms, preferably from about 1 to 6 carbon atoms, or a halogen atom including fluorine, chlorine, bromine and iodine, preferably fluorine, chlorine and bromine and where $p$ is a positive integer having a numeric value from about 1 to 5, preferably from about 1 to 3;

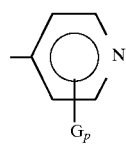

(b)

where G and $p$ are as previously defined;

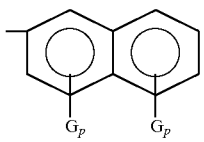

(c)

where G and $p$ are as previously defined, but the preferred numeric values for $p$ are from about 1 to 2; or biphenyl. It should be understood that hydrogen atoms occupy any unoccupied sites in the above definition of R. Representative examples of type (a) aryl,methyl ketones of formula (V) are where R is phenyl, tolyl, xylyls, mesityl, isopropylphenyls, tertbutylphenyls, methoxy phenyls, dimethoxy phenyls, trimethoxy phenyls, fluorophenyl, difluorophenyl, trifluorophenyl, chlorophenyl, dichlorophenyl and trichlorophenyl. Representative examples of type (c) aryl,methyl ketones of formula (V) where R is pyridyl and methyl pyridyls. Representative examples of type (c) aryl,methyl ketones of formula (V) where R is naphthyl and methyl naphthyls.

X is selected from the representative and illustrative group consisting of a fluoride, chloride, bromide, iodide, tetrafluoroborate, perchlorate, or perbromate, with chloride-containing or fluoride-containing anions being preferred.

Once the starting bis-pyrylium salts of formula (II) have been prepared, the poly-pyridinium salts are manufactured by reacting the poly-pyrylium salts with diamines of formula (III). This reaction is generally carried out in a polar aprotic solvent such as DMF or DMSO. After a period of time, toluene or an equivalent aromatic solvent is added to azeotrope off the water formed during the reaction. The resulting poly-pyridinium salt is recovered by precipitation in diethyl ether or similar solvents. Purification is accomplished by redissolving the polymer in DMSO, DMF or similar solvents and reprecipitation in diethyl ether or similar solvents. The polymerization reaction is shown below:

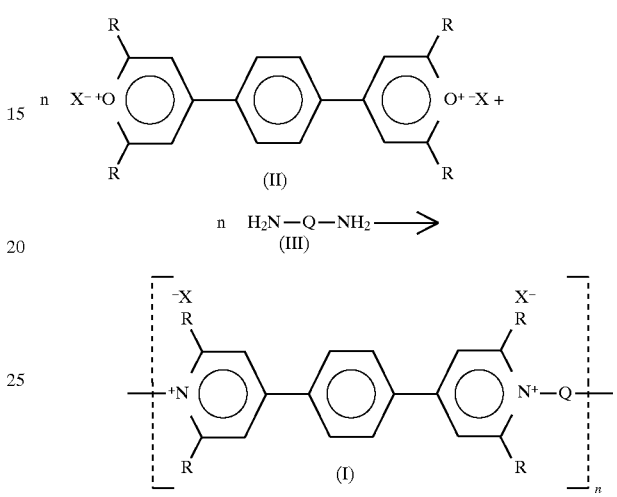

where R, X, and Q are as previously defined and n is an integer having a numeric value from about 4 to 100, preferably from about 8 to 60, and corresponding molecular weight from about 4,000 to 150,000, preferably from about 10,000 to 100,000.

While the polymerization may be carried out at room temperature, lower molecular weight products are obtained. Preferentially, higher temperatures have been found to yield superior poly-pyridinium salts. Temperatures in the range from about 100° C. to 200° C. are particularly preferred. The increased molecular weight due to a higher temperature is caused by an increase in the extent of polymerization. Higher molecular weight poly-pyrylium salts are preferred because the improved physical properties result such as fiber and film stability.

Diamines of formula (III) are selected from the representative and illustrative group consisting of:

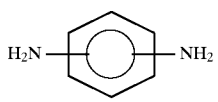

(i)

where the amino groups ($NH_2$) are located in a meta or para configuration, preferably where the amino groups ($NH_2$) are located in a para configuration;

(ii)

where the two amino groups ($NH_2$) are located either both on the same ring or one amino group on each of the rings, preferably where one amino group is on each of the rings;

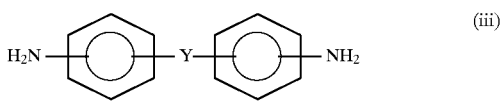

(iii)

where the amino groups are meta or para to Y radical and where the Y radical is selected from the representative and illustrative group consisting of an O atom, a S atom, a SO$_2$ group, a CH$_2$ group, polymethylene, a C(CF$_3$)$_2$, a C(CH$_3$)$_2$ group, preferably where the amino groups are para to Y and where Y is selected from the group consisting of an O atom or a CH$_2$ group;

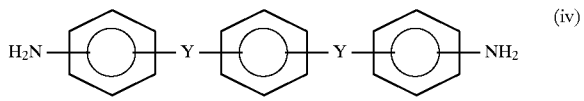

(iv)

where the amino groups are meta or para to Y and where each Y is independently selected from the representative and illustrative group consisting of a linking bond, an O atom, a S atom, a SO$_2$ group, a CH$_2$ group, a C(CF$_3$)$_2$ or a C(CH$_3$)$_2$ group, preferably where the amino groups are para to each Y and where each Y is a linking bond; and

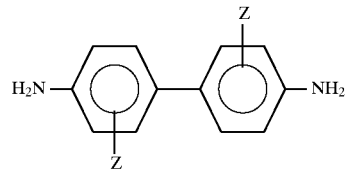

(v)

where each amino group is para to the linking bond and where each Z is a substituent selected from the representative and illustrative groups consisting of a hydrogen atom, an alkyl group having 1 to 4 carbon atoms, an alkoxy group having from 1 to 4 carbon atoms, a halogen atom, or a halogenated alkyl group having from 1 to 4 carbon atoms and where each Z substituent can be ortho or meta to the linking bond, preferably where each Z is hydrogen, methoxy and in the meta position relative to the linking bond or trifluoromethyl and in the ortho position relative to the linking bond.

Representative examples of type (i) diamines of formula (III) are 1,3-diaminobenzene and 1,4-diaminobenzene. Representative examples of type (ii) diamines of formula (III) are 1,5-diaminonaphthalene and 1,8-diaminonaphthalene. Representative example of type (iii) diamines of formula (III) are bis[4-aminophenyl] ether, bis[4-aminophenyl] sulfide, bis[4-aminophenyl] sulfone, and bis[4-aminophenyl] methane. Representative examples of type (iv) diamines of formula (III) are 1,4-bis(4-aminophenyl) benzene and 1,4-bis(4-aminophenoxy) benzene. Representative examples of type (v) diamines of formula (III) are benzidine, 2,2'-bis[trifluoromethyl] benzidine, 3,3'-dimethoxy benzidine, 2,2'-dimethyl benzidine, 2,2' dichloro benzidine and 2,2'-dibromo benzidine.

The above preferred diamines to formula (III) yield poly pyridinium salts which are rigid rods due to the extreme rigidity of their backbones.

While the number of monomeric units in the polymers of the invention may vary, preferably n will be an integer having a numeric value from about 8 and 60 and a molecular weights of about 4,000 to 150,000 and preferably 10,000 to 100,000.

The preparation reaction of scheme 1 as described above is particularly preferred because it is more versatile than reaction scheme 2 in that a wider variety of counterions X can be incorporated using Scheme 1.

Thus, scheme 1 can be readily used to form tetra fluoroborate poly-pyridinium salts and perchlorate poly pyridinium salts while scheme 2 is primarily limited to the formation of tetrafluoroborate poly pyridinium salts.

The doping reaction requires treating the poly-pyridinium salts of formula (II), which are normally in fiber form, in a purified solution of N,N-dimethylformamide (DMF) (distilled over CaO) with an appropriate dopant such as LI$_2$TCNQ under nitrogen for approximately 24 hours resulting in a partial or complete replacement of the X ions as previously described with the TCNQ dopant ions. The reaction mixture is then added to methanol which causes the doped poly-pyridinium salt to precipitate as a dark colored fibrous polymer. The doped poly-pyridinium salt fiber are usually dark blue in color. The fibers are then dried under reduced atmosphere at ambient temperatures. The resistivity of these polymers or the inverse of resistivity, their conductivity, is measured in a Dupont conductor composition 4922 apparatus. They are measured in pellet form in a manner known throughout the literature.

The following examples, while not intended to be limiting in nature, are illustrative of the invention.

Preparation of Bis-Pyrylium Salt of Formula (II)

EXAMPLE 1

In this example, 4,4'-p-phenylene-bis-[2,6-diphenyl pyrylium] ditetrafluoroborate, a compound of formula (II) where R=phenyl and X=BF$_4$, was prepared according to Scheme 1.

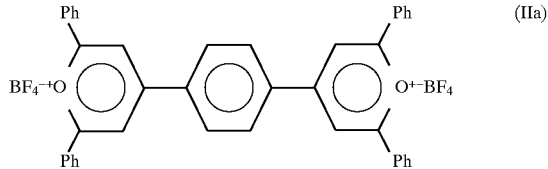

(IIa)

A solution of 40 grams (0.3 moles) of terephthalaldehyde and 217 grams (1.8 moles) of acetophenone (a compound of formula (V) above) were mixed in 1 L of 95% ethanol and then heated to 65° C. until it became homogeneous. To the above solution, 42 g (0.75 mole) of potassium hydroxide in 45 mL of water was added dropwise over a 30 minute period with vigorous stirring using a mechanical stirrer. A yellow bischalcone intermediate precipitated out immediately. The heterogeneous reaction mixture was then heated to reflux for 4–5 hours until the reaction mixture turned pink. During this period of time the bischalcone redissolved and reacted with an additional two equivalents of acetophenone to form the desired tetraketone which reprecipitated out. The reaction mixture was filtered hot and the pink solid was collected to afford 162 g (94%) of relatively pure product suitable for use in the next reaction. Analytically pure sample could be obtained by recrystallization from toluene in small quantity. A large quantity of the desired tetraketone could be purified by continuous extraction with toluene using Sohxlet extractor to remove trace of more soluble impurity to yield colorless product. The purified product had the following properties: mp=205°–206° C. (toluene), IR(KBr): 1683 cm$^{-1}$, C=O.

A suspension of triphenylmethanol (62.4 g, 0.24 mole) in 700 mL of acetic anhydride was placed in a three-necked round-bottom flask equipped with a mechanical stirrer. The mixture was warmed up to 65° C. until it became a clear solution and then cooled back to room temperature. To the above cloudy solution, 55 g (0.3 moles) of 49% fluoboric acid was added dropwise carefully while the reaction mixture was kept at 20°–25° C. with water bath during this exothermic process. After the addition of fluoboric acid, the reaction mixture became a homogeneous solution. Although this example uses fluoboric acid, other halogen containing acids are being used as well, such as perchloric acid, perbromic acid, and other similar halogen containing acids, results in the formation of other TPP salts.

Then 57.8 g (0.1 mole) of 3,3'-phenylenebis(1,5-diphenylpentane-1,5-dione) was added portionwise as a solid to the solution of the triphene. As soon as the starting material dissolved, a yellow product precipitated out in 5–10 minutes. The heterogeneous reaction mixture was stirred at ambient temperature overnight to ensure a complete reaction. The resultant yellow solids were filtered, washed with diether ether, water, and then 95% ethanol. The crude product was dried at 110° C. under reduced pressure to afford 70.8 g (99.2%) of the desired bis(pyrylium salts), which was pure enough for polymerization without further purification. The preferred produce of formula (IIa) had the following properties: mp=350° C. decomposed; IR(KBr); peaks at 1620, 1600, 1500, 1465, 1400 cm$^{-1}$ 1090 and 1060 (broad BF$_4$-); $^1$H-NMR(DMSO-d$_6$): , 7.514 9.0 (m, 24H, aromatic), 9.35 (s, 4H, 3,5-aromatic) ppm; Elemental Analysis (C$_{40}$H$_{28}$B$_2$F$_8$O$_2$): Cald. C 67.26, H 3.95, Found C 66.96, H 4.20.

It should be appreciated that any Aryl,methyl ketones of formula (V) including compounds where R is selected from the representative and illustrative group consisting of:

(a)

where G is selected from the representative and illustrative group consisting of an alkyl radical having from about 1 to 16 carbon atoms, preferably from about 1 to 6 carbon atoms, a cyclic alkyl radical having from about 1 to 16 carbon atoms, preferably from about 1 to 6 carbon atoms, an alkoxy radical having from about 1 to 16 carbon atoms, preferably from about 1 to 6 carbon atoms, or a halogen atom including fluorine, chlorine, bromine and iodine, preferably fluorine, chlorine and bromine and where $_p$ is a positive integer having a numeric value from about 1 to 5, preferably from about 1 to 3;

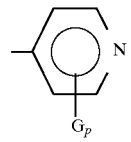

(b)

where G and $_p$ are as previously defined;

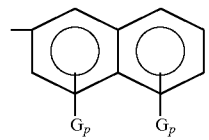

(c)

where G and $_p$ are as previously defined, but the preferred numeric values for $_p$ are from about 1 to 2; or biphenyl, can be used in place of acetophenone by substituting one of the above aryl,methyl ketones into the preparation at the molar amount required. It should be understood that hydrogen atoms occupy any unoccupied sites in the above definition of R.

EXAMPLE 2

In this example, 4,4'-p-phenylene-bis-[2,6-diphenyl pyrylium] ditetrafluoroborate of example 1 (i.e., formula (IIa)) was prepared according to Scheme 2.

A mixture of 6.7 grams (0.05 moles) of terephthalaldehyde and 12.0 grams (0.1 moles) of acetophenone were dissolved in 200 mL of 95% ethanol at 60°– 70° C. To the above solution, 3.0 grams (0.075 moles) sodium hydroxide in 32 mL of water 18 mL of 95% ethanol was added dropwise. The bischalcone product began precipitating out of solution immediately and the reaction appeared to be complete in 5–10 minutes. The heterogeneous solution was heated at 60°–70° C. for an additional 20 minutes. The reaction mixture was cooled and the product was filtered, washed with 95% ethanol and a mixture of toluene/hexane successively. The crude product was recrystallized from toluene to afford 15.6 g (95%) of yellow bischalcone in needle shape. mp=194°–195° C., IR(KBr): 1660 cm$^{-1}$, C=O.

To a suspension of 3,3'-p-phenylenediacrylophenone (3.38 g, 0.01 mole) and acetophenone (2.4 g, 0.02 mole) in 100 mL of toluene, boron trifluoride etherate (100 mL, 0.82 mole) was added carefully at ambient temperature. The suspension became a clear solution immediately, but gradually turned into a yellow suspension over a 10–15 minute period. The heterogeneous reaction mixture was refluxed for 2–3 hours and the water formed in the reaction was removed by toluene/water azeotrope with a Dean-Stark trap. During this period of time, the yellow suspension first changed to orange color, then became a clear orange solution and eventually turned into a brown-orange solution at the end. Also fumes came out from the condenser during refluxing. The reaction mixture was evaporated to dryness by a rotary evaporator. Then the dark brown residue was triutated with 95% ethanol, and the resulting solids were collected to yield 4.5 g (63%) of yellowish orange bis(pyrylium salts). The fumes were probably unreacted BF$_3$ and some HF generated during the reaction with BF$_3$ and water formed during aromatization of the positively charged oxygen containing rings on both ends of formula (IIa).

It should be appreciated that any Aryl,methyl ketones of formula (V) including compounds where R is selected from the representative and illustrative group consisting of:

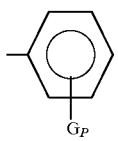

(a)

where G is selected from the representative and illustrative group consisting of an alkyl radical having from about 1 to 16 carbon atoms, preferably from about 1 to 6 carbon atoms, a cyclic alkyl radical having from about 1 to 16 carbon atoms, preferably from about 1 to 6 carbon atoms, an alkoxy radical having from about 1 to 16 carbon atoms, preferably from about 1 to 6 carbon atoms, or a halogen atom including fluorine, chlorine, bromine and iodine, preferably fluorine, chlorine and bromine and where $_p$ is a positive integer having a numeric value from about 1 to 5, preferably from about 1 to 3;

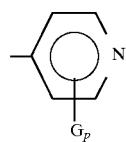 (b)

where G and $p$ are as previously defined:

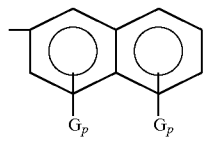 (c)

where G and p are as previously defined, but the preferred numeric values for $p$ are from about 1 to 2; or biphenyl, can be used in place of acetophenone by substituting one of the above aryl,methyl ketones into the preparation at the molar amount required. It should be understood that hydrogen atoms occupy any unoccupied sites in the above definition of R.

EXAMPLE 3

In this example, 4,4'-p-phenylene-bis-[2,6-diphenyl] pyrylium diperchlorate formula (IIb) (compound of formula (II) where R=phenyl and X=ClO$_4$) was prepared according to Scheme 1 to yield diperchlorate shown below.

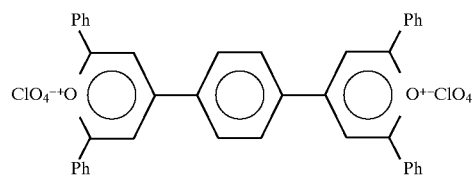 (IIb)

Compound (IIb) is prepared according to Scheme 1 in the manner described in connection with the synthesis of compound (IIa) in Example 1, but in which perchloric acid is substituted for the fluoboric acid to provide the perchloric bis-pyrylium salt (IIb).

It should be appreciated that any Aryl, methyl ketones of formula (V) including compounds where R is selected from the representative and illustrative group consisting of:

 (a)

where G is selected from the representative and illustrative group consisting of an alkyl radical having from about 1 to 16 carbon atoms, preferably from about 1 to 6 carbon atoms, a cyclic alkyl radical having from about 1 to 16 carbon atoms, preferably from about 1 to 6 carbon atoms, an alkoxy radical having from about 1 to 16 carbon atoms, preferably from about 1 to 6 carbon atoms, or a halogen atom including fluorine, chlorine, bromine and iodine, preferably fluorine, chlorine and bromine and where $p$ is a positive integer having a numeric value from about 1 to 5, preferably from about 1 to 3;

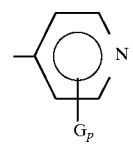 (b)

where G and $p$ are as previously defined;

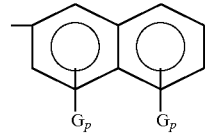 (c)

where G and $p$ are as previously defined, but the preferred numeric values for $p$ are from about 1 to 2; or biphenyl, can be used in place of acetophenone by substituting one of the above aryl,methyl ketones into the preparation at the molar amount required. It should be understood that hydrogen atoms occupy any unoccupied sites in the above definition of R.

PREPARATION OF POLY-PYRIDINIUM SALTS OF FORMULA (I)

EXAMPLE 4

In this example, poly-pyridinium salt (Ia) was prepared by reacting compound (IIa) from Example 1 or 2 with 1,4-phenylene diamine.

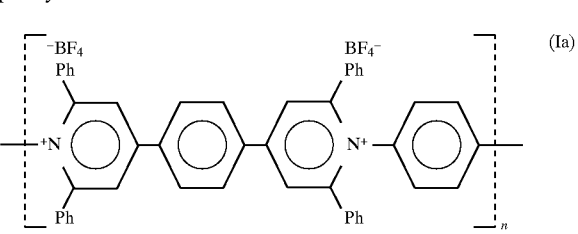 (Ia)

A mixture of 1.4825 grams (2 milli moles) of compound (IIa), from Example 1 or 2, is combined with 0.2163 grams (2 milli moles) of 1,4-phenylenediamine, and 9.32 grams of DMF, previously distilled over CaO. The resulting solution is heated at about 195° C. for 24 hours. The solution is then poured into ether with stirring, thereby precipitating a poly-pyridinium salt compound of formula (Ib) as a light brown solid. The above polymer had intrinsic viscosity of 0.294 in DMF at 30° C.

It should be appreciated that any of diamines of formula (III) including:

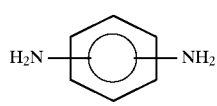 (i)

where the amino groups (NH$_2$) are located in a meta or para configuration, preferably where the amino groups (NH$_2$) are located in a para configuration;

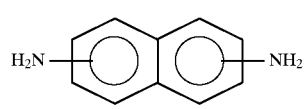 (ii)

where the two amino groups (NH$_2$) are located either both on the same ring or one amino group on each of the rings, preferably where one amino group is on each of the rings;

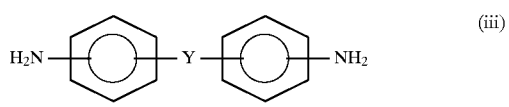

(iii)

where the amino groups are meta or para to Y radical and where the Y radical is selected from the representative and illustrative group consisting of an O atom, a S atom, a $SO_2$ group, a $CH_2$ group, polymethylene, a $C(CF_3)_2$, a $C(CH_3)_2$ group, preferably where the amino groups are para to Y and where Y is selected from the group consisting of an O atom or a $CH_2$ group;

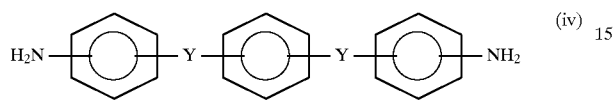

(iv)

where the amino groups are meta or para to Y and where each Y is independently selected from the representative and illustrative group consisting of a linking bond, an O atom, a S atom, a $SO_2$ group, a $CH_2$ group, a $C(CF_3)_2$ or a $C(CH_3)_2$ group, preferably where the amino groups are para to each Y and where each Y is a linking bond; and

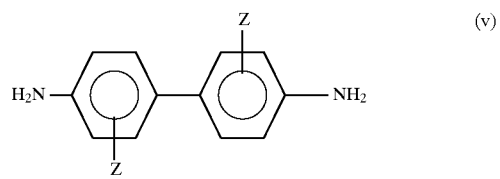

(v)

where each amino group is para to the linking bond and where each Z is a substituent selected from the representative and illustrative groups consisting of a hydrogen atom, an alkyl group having 1 to 4 carbon atoms, an alkoxy group having from 1 to 4 carbon atoms, a halogen atom, or a halogenated alkyl group having from 1 to 4 carbon atoms and where each Z substituent can be ortho or meta to the linking bond, preferably where each Z is hydrogen, methoxy and in the meta position relative to the linking bond or trifluoromethyl and in the ortho position relative to the linking bond, can be used to prepare poly pyridinium salts of formula (I) by substituting one or more of the above diamines into the preparation at the molar amount required.

EXAMPLE 5

In this example, poly-pyridinium salt (Ib) was prepared by reacting compound (IIb) from example 3, with 1,4-phenylene diamine.

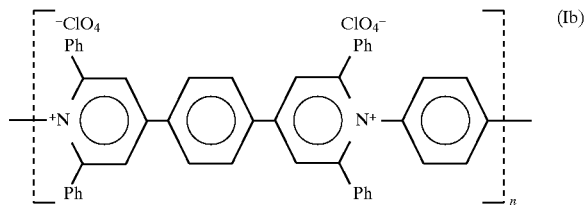

(Ib)

A mixture of 1.4791 grams (2 mili-moles) of compound (IIb), together with 0.2163 grams (2 mili-moles) of 1,4-phenylenediamine are dissolved in 9.5 gms of DMF distilled from CaO. The reaction mixture is heated to about 145° C., whereupon the mixture gradually forms a brown solution. After about 1½ hours, the mixture assumes a jellylike appearance, prompting the addition of an additional 8 mLs. of DMF, followed by a further 24 hours of heating. The resulting gels are partially dissolved in an additional 10 mLs. of DMF and heated for a further 24 hours at about 145° C. The resulting mixture is poured into ether and the poly-pyridinium perchlorate is dried under vacuum at room temperature.

It should be appreciated that any of diamines of formula (III) including:

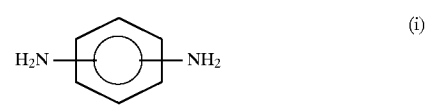

(i)

where the amino groups ($NH_2$) are located in a meta or para configuration, preferably where the amino groups ($NH_2$) are located in a para configuration;

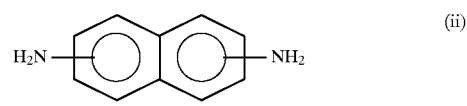

(ii)

where the two amino groups ($NH_2$) are located either both on the same ring or one amino group on each of the rings, preferably where one amino group is on each of the rings;

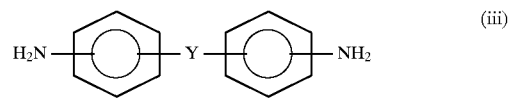

(iii)

where the amino groups are meta or para to Y radical and where the Y radical is selected from the representative and illustrative group consisting of an O atom, a S atom, a $SO_2$ group, a $CH_2$ group, polymethylene, a $C(CF_3)_2$, a $C(CH_3)_2$ group, preferably where the amino groups are para to Y and where Y is selected from the group consisting of an O atom or a $CH_2$ group;

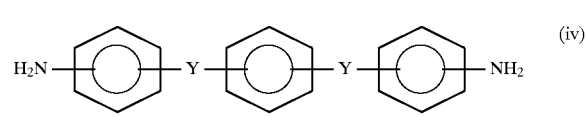

(iv)

where the amino groups are meta or para to Y and where each Y is independently selected from the representative and illustrative group consisting of a linking bond, an O atom, a S atom, a $SO_2$ group, a $CH_2$ group, a $C(CF_3)_2$ or a $C(CH_3)_2$ group, preferably where the amino groups are para to each Y and where each Y is a linking bond; and

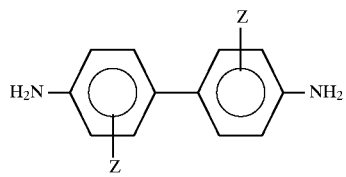

(v)

where each amino group is para to the linking bond and where each Z is a substituent selected from the representative and illustrative groups consisting of a hydrogen atom, an alkyl group having 1 to 4 carbon atoms, an alkoxy group having from 1 to 4 carbon atoms, a halogen atom, or a halogenated alkyl group having from 1 to 4 carbon atoms and where each Z substituent can be ortho or meta to the linking bond, preferably where each Z is hydrogen, methoxy and in the meta position relative to the linking bond or trifluoromethyl and in the ortho position relative to the linking bond, can be used to prepare poly pyridinium salts of formula (I) by a mere substitution of the diamine used above into the preparation at the appropriate molar ratio need to satisfy a near one to one molar mixture of an above enumerated diamine and polypyrilium salt (Ia).

EXAMPLE 6

In this example, poly-pyridinium salt (Ic) is prepared by reacting compound (IIa) from Example 1 or 2 with oxydianiline.

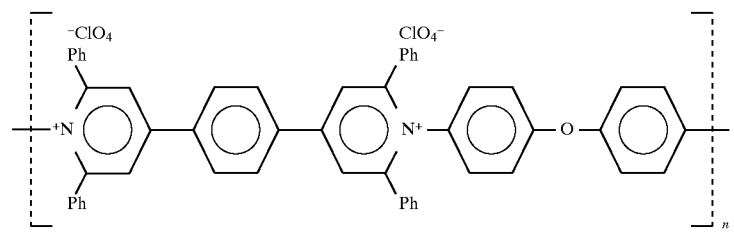

A mixture 1.4285 grams (2 milli moles) of compound (IIa), from Experiment 1 or 2, together with 0.4005 grams (2 milli moles) of oxydianiline were dissolved in 10.5 grams of dimethylsulfoxide, DMSO. The reaction mixture was heated under a nitrogen blanket at 110° C. for two hours and then 10 mLs of toluene was added. The temperature was raised to 195° C. during which time a toluene-water water azeotrope was distilled from the reaction mixture. The temperature was then maintained at 195° C., for 24 hours. The resulting brown, viscous solution was thereafter diluted with 10 additional mLs of DMSO, and then combined with ether with rapid stirring, resulting in the precipitation of the desired poly-pyridinium tetrafluoroborate, compound (Ic). The polymer was redissolved in about 30 mLs of dimethyl formamide, DMF, and then precipitated by combination with ether. The pale orange, fibrous polymer obtained was subsequently dried under vacuum overnight at 100°–110° C. Examination of the polymer, which has the structural formula (Ic) found it to have a melting temperature of about 405° C. Films of the polymer were cast from DMF solution. The intrinsic viscosity of the above polymer was 1.85 in DMF of 30° C. and the melting point was 405° C. However, higher intrinsic viscosities were also achieved by increasing reaction time. In fact, viscosity as high as 2.76 in DMF at 30° C. were obtained.

EXAMPLE 7

In this example, poly-pyridinium salt of formula (Id) below was prepared by reacting compound (IIa) from examples 1 and 2 with benzidine.

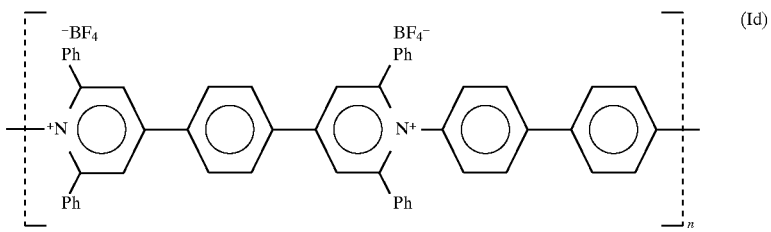

A mixture of 28.56 grams (0.04 moles) of compound (IIa) and 7.36 grams (0.04 moles) of benzidine was added to 240 mLs of DMSO. The mixture was heated to 110° C. for two hours under nitrogen. To the mixture was added 100 mL of toluene in order to drive the water off as a toluene water aziotrope. The aziotrope and excess toluene were gradually removed from the reaction mixture through the use of Dean-Stark trap over a 4–5 hour period of time. The reaction mixture was heated at 190° C. with vigorous stirrings for 24 hours. The resultant viscous solution was slowly poured into a large excess (25 times in volume) of diethyl ether with rapid stirring to precipitate the fibrous yellow poly-pyridinium salts. The crude product was redissolved in 200 mL of hot DMS and then reprecipitated from diethyl ether. The fibers were dried at 120° C. under reduced pressure overnight to afford the poly-pyridinium tetrafluoroborate in quantitative yield.

EXAMPLE 8

In this example, poly-pyridinium salt of the formula (Ie) was prepared by reacting compound (IIa) from Example 1 or 2 with 3,3'-dimethoxy benzidine.

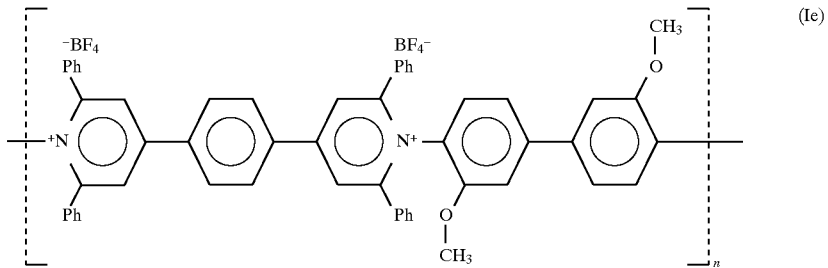

A mixture of 28.56 grams (0.04 moles) of compound (IIa) and 8.96 grams (0.04 moles) of 3,3'dimethoxy benzidine was added to 240 mLs of DMSO. The mixture was heated to 110° C. for two hours under nitrogen. To the mixture was added 100 mL of toluene in order to drive the water off as a toluene water aziotrope. The aziotrope and excess toluene were gradually removed from the reaction mixture through the use of Dean-Stark trap over a 4–5 hour period of time. The reaction mixture was heated at 190° C. with vigorous stirrings for 24 hours. The resultant viscous solution was slowly poured into a large excess (25 times in volume) of diethyl ether with rapid stirring to precipitate the fibrous yellow poly-pyridinium salts. The crude product was redissolved in 200 mL of hot DMS and then reprecipitated from diethyl ether. The fibers were dried at 120° C. under reduced pressure overnight to afford the poly-pyridinium tetrafluoroborate in quantitative yield.

EXAMPLE 9

In this example, poly-pyridinium salt (If) was prepared by reaction compound (IIa) from example 1 or 2 with 2,2'trifluoromethyl benzidine.

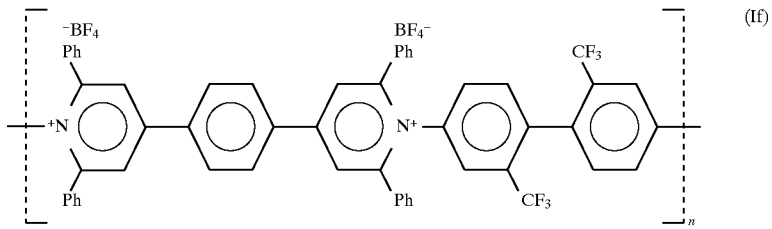

A mixture of 28.56 grams (0.04 moles) of compound (IIa) and 12.80 grams (0.04 moles) of 2,2'trifluoromethyl benzidine was added to 240 mLs of DMSO. The mixture was heated to 110° C. for two hours under nitrogen. To the mixture was added 100 mL of toluene in order to drive the water off as a toluene water aziotrope. The aziotrope and excess toluene were gradually removed from the reaction mixture through the use of Dean-Stark trap over a 4–5 hour period of time. The reaction mixture was heated at 190° C. with vigorous stirrings for 24 hours. The resultant viscous solution was slowly poured into a large excess (25 times in volume) of diethyl ether with rapid stirring to precipitate the fibrous yellow poly-pyridinium salts. The crude product was redissolved in 200 mL of hot DMS and then reprecipitated from diethyl ether. The fibers were dried at 120° C. under reduced pressure overnight to afford the poly-pyridinium tetrafluoroborate in quantitative yield.

EXAMPLE 10

In this example, poly-pyridinium salt (Ig) was prepared by reacting compound (IIa) from Example 1 or 2 with 1,4-bis(4-aminophenyl) benzene.

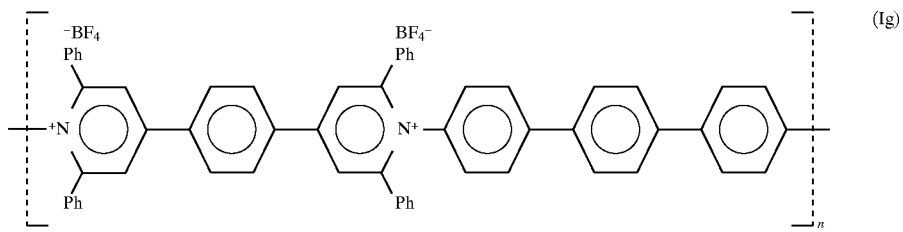

A mixture of 28.56 grams (0.04 moles) of compound (IIa) and 10.40 grams (0.04 moles) of 1,4-bis(4-aminophenyl) benzidine was added to 240 mLs of DMSO. The mixture was heated to 110° C. for two hours under nitrogen. To the mixture was added 100 mL of toluene in order to drive the water off as a toluene water aziotrope. The aziotrope and excess toluene were gradually removed from the reaction mixture through the use of Dean-Stark trap over a 4–5 hour period of time. The reaction mixture was heated at 190° C. with vigorous stirring for 24 hours. The resultant viscous solution was slowly poured into a large excess (25 times in volume) of diethyl ether with rapid stirring to precipitate the fibrous yellow polypyridinium salts. The crude product was redissolved in 200 ml of hot DMS and then reprecipitated from diethyl ether. The fibers were dried at 120° C. under reduced pressure overnight to afford the polypyridinium tetrafluoroborate in quantitative yield.

EXAMPLE 11

Preparation of Polypyridinium-TCNO (1:1) Simple Salts

Polypyridinium tetrafluoroborate (1 mmole) was dissolved in 30 ml of dry DMF at 100° C. and then the solution was cooled back to room temperature. To the above homogeneous solution, $Li^{\oplus} TCNQ^{\ominus}$ (3 mmole) was added and the resultant green solution was stirred at ambient temperature under nitrogen for 24 hours. The reaction mixture was precipitated from absolute ethanol to afford short dark blue fibers. The fiber was dried under reduced pressure at ambient temperature overnight to yield polypyridinium TCNQ simple salts in quantitative yield which were found to be highly conducting.

It should be appreciated that other dopants commonly used in rendering polymers of this type conductive can be used instead of $Li_2TCNQ$ as the dopant in the above example to prepare different classes of similar conducting polymers involving polypyridinium salts of the formula (I).

EXAMPLE 12

Synthesis of Aromatic Poly(pyridinium tetrafluoroborates)

Pure bis(pyrylium tetrafluoroborates) were polymerized with diamines (4,4'-oxydianiline (ODA) or benzidine) in DMSO under reflux. The water generated during the polymerization was removed from the reaction mixture through an azeotropic process. The poly(pyridinium tetrafluoroborates) were precipitated with diethyl ether in fibrous form because of their high molecular weight.

The reaction solution became increasingly viscous during the azeotrope distillation, and it is speculated that the polymerization reaction may have slowed down because of the increasing viscosity. The distillation time was extended to 16 hours leading to a very viscous gel-like polymer solution without further reaction at 195° C. The reaction at this high temperature did at times, cause decomposition of the DMSO solvent. As listed in Table I, the inherent viscosities of the poly(pyridinium tetrafluoroborates) from ODA and benzidine respectively were 3.8 dl/g and 4.9 dl/g, respectively. The polymer prepared from benzidine exhibited a higher viscosity due to its rigid rod-like nature. Light scattering data indicated that the weight average molecular weight ($M_w$) of the polymer prepared from benzidine was 133,000±500 g/mole. This is approximately equivalent to 150±10 for the degree of polymerization. The higher molecular weight is attributed to the longer azeotrope distillation time during the polymerization.

EXAMPLE 13

Synthesis of Aromatic Poly(pyridinium triflates)

A. Synthesis of the bis(pyrylium triflate) monomer

An alternative approach for increasing the molecular weight of the poly(pyridinium salts) was to further raise the reactivity of the pyrylium salt with the amine. Since the reaction is extremely viscous, especially during the final stage of polymerization, it was speculated that a highly reactive system would force the equilibrium established between the polymerization and depolymerization reactions to favor the polymerization side.

To accomplish this increase in reactivity, the counter ion of the bis(pyrylium salt) monomer was changed from the tetrafluoroborate anion to the triflate anion. The triflic anion was expected to be less nucleophilic than then tetrafluoroborate anion, in that it has a higher dissociation from the positively charged pyrylium ring in the solution. The pyrylium ring, with a further dissociated triflate counter anion was believed to be more easily attacked by amines than the pyrylium ring with a closer associated tetrafluoroborate counter anion. Therefore, the bis(pyrylium salt) monomer with triflate counter ion was expected to be more reactive than with the tetrafluoroborate counter ion.

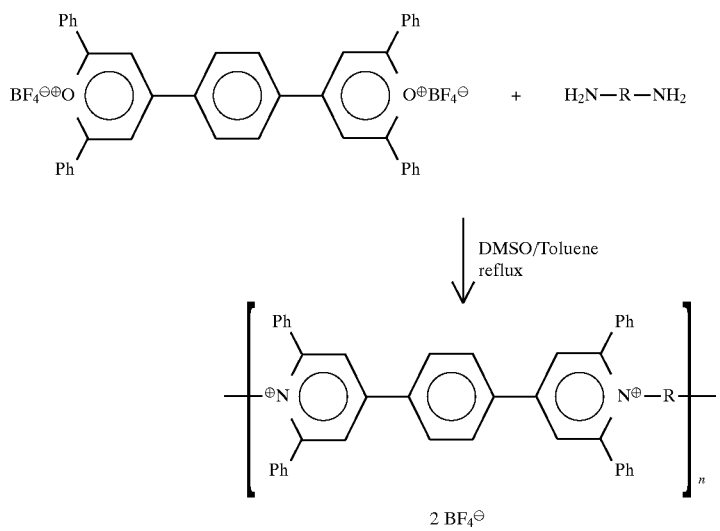

To synthesize the monomer with a triflate counter ion, triffic acid was used to convert the tetraketone to the bis(pyrylium salt) in the presence of triphenol methanol.

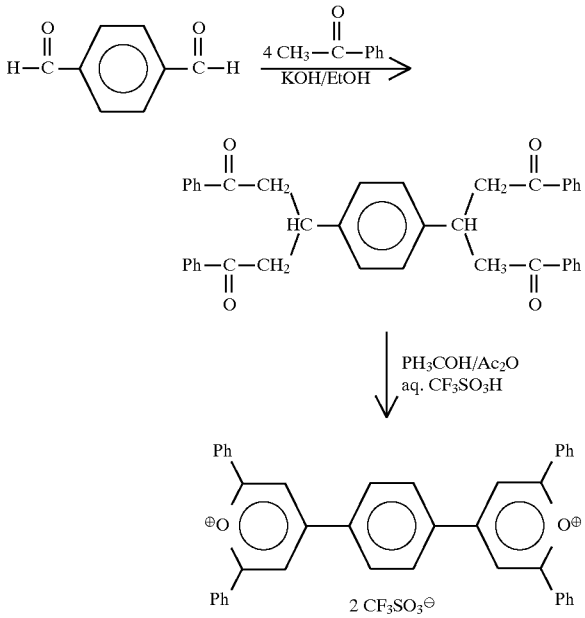

Since triflic acid is a strong acid and may react very vigorously to cause side reactions, it was diluted to a 50 wt % solution with distilled water before use. After being quantitatively precipitated from the reaction solution, the bis(pyrylium triflate) was washed with acetic anhydride, and dried at 110° C. under reduced pressure. The synthesized bis(pyrylium triflate) monomer end product was very pure.

B. Synthesis of Aromatic Poly(pyridinium triflates)

The bis(pyrylium triflate) monomer was polymerized with a series of aromatic diamines. The procedure of the polymerization was similar to that for the polymerization for the bis(pyrylium tetrafluoroborate) monomer. However, this polymerization proceeds much faster than for the bis (pyrylium tetrafluoroborate) monomer. In the reaction of bis(pyrylium tetrafluoroborate) monomer with diamines, the azeotrope distillation was carried out for 10–16 hours to complete the polymerization. The polymerization was usually complete after the azeotrope distillation was carried out for only 3–4 hours. Subsequent to this time, the solutions became viscous, gel-like and unstirrable. These polymer gels can be redissolved in an excess amount of DMSO to form clear, yellow solutions. The inherent viscosities of the poly(pyridinium triflates) ranged from 8.3 to 18.7 dl/g, as listed in Table I. Since the polymer solutions were so viscous, the measurements of the inherent viscosities were made only at concentrations in the range of 0.11–0.15 g/dl, instead of at the standard concentration of 0.5 g/dl.

The flexible polymers generally showed a lower inherent viscosity than the rigid ones even though they had the same degree of polymerization. Therefore, the polymer prepared from 4,4'-oxydianiline displayed the lowest inherent viscosity because of the flexible ether linkage in the backbone.

The polymer prepared from benzidine had the highest inherent viscosity. In addition to the rigid-rod characteristics, this may be due to the free hindrance and free substituent deactivation of the chain growth. The next highest inherent viscosity was the polymer prepared from 3,3'-dimethylbenzidine. The steric effect due to the methyl group may be important to the slightly lower viscosity. Another important factor is the deactivation by the substituent group. The 2,2'-bis(trifluoromethyl)benzidine was slightly less reactive than benzidine because of the electron-withdrawing nature of the trifluoromethyl groups. The substituent at the 2 and 2' positions also prevented the planar conformation between the two phenyl rings so that each amine group was free from the influence of each other. This is shown by the fact that the polymer had a lighter color (yellowish white) than the other polymers, (mostly yellow) due to the breaking of the conjugation between the two phenyl rings.

Discussion

What has been described is an improved process by which the reaction is performed by reacting the bis(pyrylium) salt with a diamine at elevated temperatures (i.e., from 100° C. to 200° C.) without the use of an organic base (e.g., amine or aza compound) catalyst. Since soluble protonic acids are indicated to be necessary in the procedures described in the prior art (Katritzky), higher temperatures, (i.e., those greater than 100° C.) are not possible. The use of higher temperature results in increased molecular weight, due to an increase in the extent of polymerization, resulting in improved physical properties.

The polymer solutions formed were so viscous from an absolute viscosity perspective, they were diluted to better measure the inherent viscosity by GPC. Diluting a polymer solution will decrease its absolute viscosity, but will not affect its inherent or intrinsic viscosity. To give an example, diluting an absolute polymer viscosity from 0.5 g/dl to 0.1 g/dl, will still result in a polymer with an inherent or intrinsic viscosity of 18. In other words, the dilution of a polymer sample has no effect on the molecular weight of the polymer sample contained therein.

Only by changing to the process steps taught only by this invention, was it possible to achieve higher molecular weights which are more desirable properties of the final polymer. The insight lie in the need to perform the synthetic reaction at temperatures greater than 100° C. as taught by the prior art. By changing the solvent system, higher temperatures were possible, which drove the polymerization reaction further, resulting in higher molecular weights.

The difference in process steps is nowhere more vivid than in the direct comparison of Example #6 of Katritzky (U.S. Pat. No. 4,898,923 or U.S. Pat. No. 4,841,021) and the first entry in Table 1. Both polypyridinium salts can be characterized by the following generic formula:

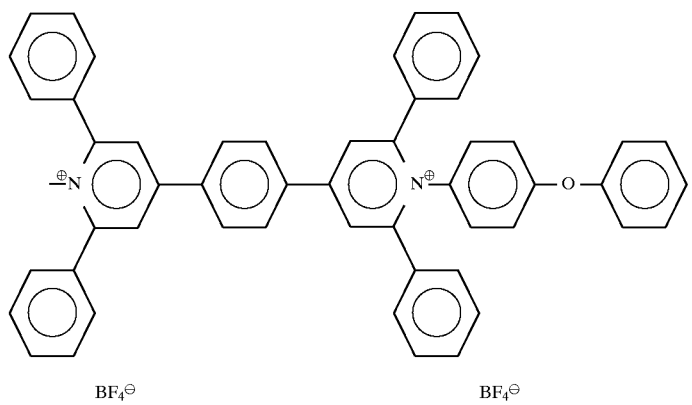

and wherein the polypyridinium salt product's molecular weight as synthesized by both the process of the instant invention and the prior art is shown as follows:

| Polypyridinium Salt | Invention | Prior Art (Katritzky) |
|---|---|---|
| Intrinsic Viscosity (dL/g) | 8.3 | 0.6 |

The degree of polymerization obtainable in product produced in accordance with the teachings of this invention, is significantly higher than the degree of polymerization achieved in the prior art (Katritzky) for the same product. The new product is more than an order of magnitude higher. This higher molecular weight is once again, only achievable by using the process steps of the invention.

TABLE I

| $X^{\ominus}$ | —Ar— | $\eta_{inh}$ (dL/g) | Conc. (g/dL) | Tensile Modulus (GPa) |
|---|---|---|---|---|
| $CF_3SO_3^{\ominus}$ | –⟨C6H4⟩–O–⟨C6H4⟩– | 8.3 | 0.2 | 2.7 |
| $CF_3SO_3^{\ominus}$ | –⟨C6H4⟩–⟨C6H4⟩– | 18.7 | 0.11 | 5.5 |
| $CF_3SO_3^{\ominus}$ | –⟨C6H3(CH3)⟩–⟨C6H3(CH3)⟩– | 14.3 | 0.14 | 5.2 |
| $CF_3SO_3^{\ominus}$ | –⟨C6H4⟩– | 8.6 | 0.15 | 2.6 |

TABLE I-continued

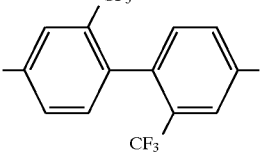

| $X^\ominus$ | —Ar— | $\eta_{inh}$ (dL/g) | Conc. (g/dL) | Tensile Modulus (GPa) |
|---|---|---|---|---|
| $CF_3SO_3^\ominus$ | 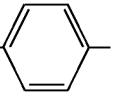 | 11.3 | 0.14 | 2.3 |
| $CF_3SO_3^\ominus$ | 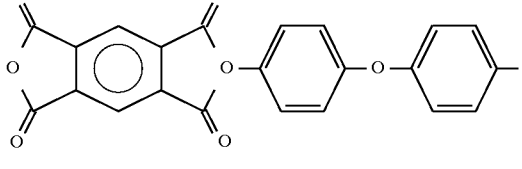 | 2.2 | 0.5 | 1.3 |
| $CF_3SO_3^\ominus$ | 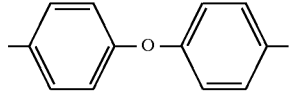 | 3.8 | 0.5 | 1.5 |
| $BF_4^\ominus$ | 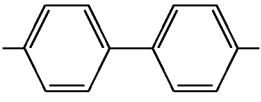 | 3.8 | 0.5 | |
| $BF_4^\ominus$ | 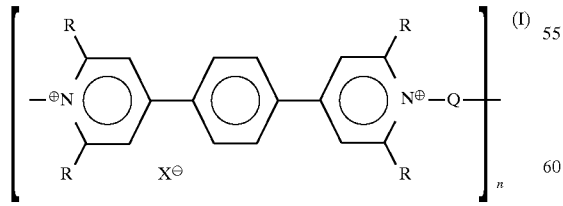 | 4.9 | 0.5 | |

While in accordance with the patent statutes, a preferred embodiment and best mode has been described, the invention is not to be construed as being limited by such description, but rather is to be construed by the following claims.

What is claimed is:

1. A polymer film comprising a polypyridinium salt of formula (I)

where R is defined by the formula (a)

and where G is selected from the group consisting of an alkyl radical having from 1 to 6 carbon atoms, a cyclic alkyl radical having from 3 to 6 carbon atoms, an alkoxy radical having from 1 to 6 carbon atoms, and a halogen atom, and further wherein p is a positive integer having a numeric value of from 0 to 5 in formula (a), X is a halogen containing ion, Q is a divalent aryl radical, and n is a positive whole integer; wherein said polypyridinium salt is made by a process comprising the steps of:

contacting a bis-prylium salt of formula (II)

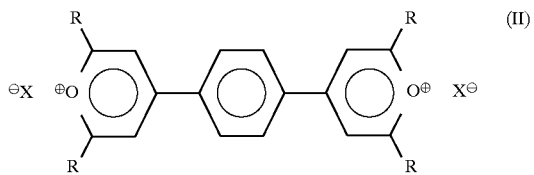

wherein R and X are as previously defined, with an aryl containing diamine selected from diamines defined by the formulas (i), (ii), or (iii)

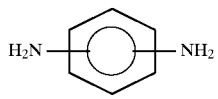

where the amino groups of formula (i) are located in a meta or para configuration,

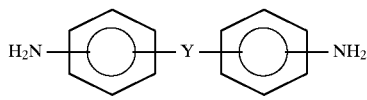

where the amino groups of formula (ii) are meta or para to the Y group and where the Y group is selected from the group consisting of an oxygen, sulfur, a $SO_2$ group, a $CH_2$ group, and a $C(CF_3)_2$ group, or

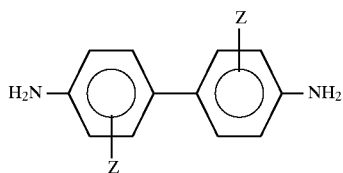

where each amino group in formula (iii) is para to the linking bond and where each Z is a substituent selected from the group consisting of a hydrogen atom, an alkyl group having from 1 to 4 carbons, an alkoxy group having from 1 to 4 carbons, a halogen atom, or a halogenated alkyl group having from 1 to 4 carbons, and where each Z substituent can be ortho or meta to the linking bond; wherein said step of contacting occurs in a polar aprotic solvent at a temperature greater than 100° C., and without the use of an organic base.

2. The polymer film of claim 1, where Y is selected from the group consisting of oxygen and a $CH_2$ group, and Z is a substituent selected from the groups consisting of a hydrogen atom, an alkyl group having from 1 to 4 carbons, an alkoxy group having from 1 to 4 carbons, a halogen atom, or a halogenated alkyl group having from 1 to 4 carbons, and where each Z substituent can be ortho or meta to the linking bond, and when Z is selected from the group consisting of hydrogen and methoxy, Z is in the meta position relative to the linking bond and when Z is trifluoromethyl, Z is in the ortho position relative to the linking bond.

3. A polymer film, as set forth in claim 1, wherein said step of contacting results in a polymer having an inherent viscosity greater than or equal to 2.2 at a concentration of about 0.5 b/dL.

4. A polymer film comprising a polypyridinium salt of formula (I)

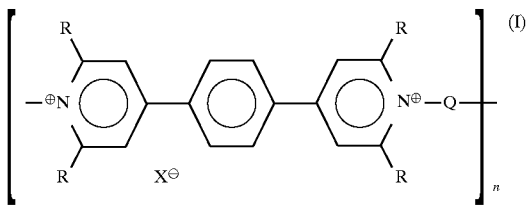

where R is defined by the formula (a)

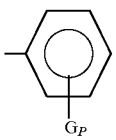

and where G is selected from the group consisting of an alkyl radical having from 1 to 6 carbon atoms, a cyclic alkyl radical having from 3 to 6 carbon atoms, an alkoxy radical having from 1 to 6 carbon atoms, and a halogen atom, and further wherein p is a positive integer having a numeric value of from 0 to 5 in formula (a), X is a halogen containing ion, Q is a divalent aryl radical, and n is a positive whole integer.

5. The polymer film of claim 4, where Q is derived from the diamines of formula (III)

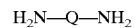

and selected from the group consisting of (i), (ii) and (iii)

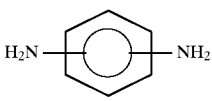

where the amino groups of formula (i) are located in a meta or para configuration,

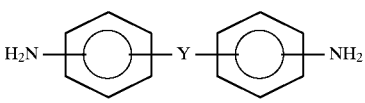

where the amino groups of formula (ii) are meta or para to the Y group and where the Y group is selected from the group consisting of an oxygen, sulfur, a $SO_2$ group, a $CH_2$ group, and a $C(CF_3)_2$ group, or

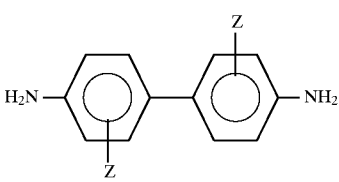

where each amino group in formula (iii) is para to the linking bond and where each Z is a substituent selected from the group consisting of a hydrogen atom, an alkyl group having from 1 to 4 carbons, an alkoxy group having from 1 to 4 carbons, a halogen atom, or a halogenated alkyl group having from 1 to 4 carbons, and where each Z substituent can be ortho or meta to the linking bond.

6. A polymer film, as set forth in claim 1, wherein the polymer has an inherent viscosity greater than or equal to 2.2 at a concentration of about 0.5 g/dL.

* * * * *

UNITED STATES PATENT AND TRADEMARK OFFICE
CERTIFICATE OF CORRECTION

PATENT NO. : 5,863,651
DATED : January 26, 1999
INVENTOR(S) : Harris et al.

It is certified that error appears in the above-indentified patent and that said Letters Patent is hereby corrected as shown below:

Claim 6, column 30, line 1, "as set forth in claim 1" should be "as set forth in claim 4".

Signed and Sealed this

Thirteenth Day of July, 1999

Attest:

Attesting Officer

Q. TODD DICKINSON

*Acting Commissioner of Patents and Trademarks*